United States Patent
Saxton et al.

(10) Patent No.: US 11,024,193 B1
(45) Date of Patent: Jun. 1, 2021

(54) INTERACTIVE DRIVER TEST ADMINISTRATION SYSTEMS

(71) Applicants: Eureka Saxton, Shreveport, LA (US); Shereka Garner, Shreveport, LA (US); Brandon Garner, Shreveport, LA (US)

(72) Inventors: Eureka Saxton, Shreveport, LA (US); Shereka Garner, Shreveport, LA (US); Brandon Garner, Shreveport, LA (US)

( * ) Notice: Subject to any disclaimer, the term of this patent is extended or adjusted under 35 U.S.C. 154(b) by 299 days.

(21) Appl. No.: 15/912,789

(22) Filed: Mar. 6, 2018

(51) Int. Cl.
G09B 9/052 (2006.01)
B60K 37/06 (2006.01)
G09B 7/06 (2006.01)
G09B 19/14 (2006.01)
G09B 9/05 (2006.01)
G02B 27/01 (2006.01)

(52) U.S. Cl.
CPC .............. *G09B 9/052* (2013.01); *B60K 37/06* (2013.01); *G09B 7/06* (2013.01); *G09B 9/05* (2013.01); *G09B 19/14* (2013.01); *B60K 2370/12* (2019.05); *G02B 27/01* (2013.01)

(58) Field of Classification Search
CPC . G09B 9/052; G09B 7/06; G09B 9/05; G09B 19/14; B60K 37/06; B60K 2370/12; G02B 27/01
See application file for complete search history.

(56) References Cited

U.S. PATENT DOCUMENTS

| | | | |
|---|---|---|---|
| 3,590,265 A | 6/1971 | Richardson | |
| 3,916,534 A | 11/1975 | Riccio | |
| 4,214,381 A * | 7/1980 | Clark | G09B 9/04 434/67 |
| 6,679,702 B1 * | 1/2004 | Rau | G09B 9/02 340/435 |
| D517,932 S | 3/2006 | Lum | |
| 8,506,302 B2 * | 8/2013 | Voorhees | G09B 19/167 434/219 |
| 8,725,311 B1 * | 5/2014 | Breed | A61B 5/163 701/1 |
| 8,894,415 B2 | 11/2014 | Best et al. | |
| 9,349,300 B2 * | 5/2016 | Harkness | G09B 9/05 |

(Continued)

FOREIGN PATENT DOCUMENTS

WO    WO2014042571    3/2014

*Primary Examiner* — Malina D. Blaise
(74) *Attorney, Agent, or Firm* — Keith R. Harrison (57) ABSTRACT

Interactive driver test administration systems include a vehicle actuating mechanism and an instruction vehicle movable on a vehicle travel surface and operatively engaged by the vehicle actuating mechanism for travel of the instruction vehicle on the vehicle travel surface. The instruction vehicle may include a vehicle chassis having vehicle wheels, a windshield on the vehicle chassis, driver inputs in the vehicle chassis and a central processing unit interfacing with the windshield and the driver inputs. The central processing unit may be configured to present and operate a virtual windshield screen in a selected one of a question-and-answer driver testing mode and a practical driver testing mode on the windshield. The central processing unit may be configured to operate the instruction vehicle via the vehicle actuating mechanism responsive to input from the driver inputs in the vehicle chassis. An answer selecting system may interface with the central processing unit.

3 Claims, 7 Drawing Sheets

(56) References Cited

U.S. PATENT DOCUMENTS

| | | | |
|---|---|---|---|
| 9,434,226 B1* | 9/2016 | Trigo | B60R 19/48 |
| 9,666,091 B2* | 5/2017 | Harkness | G09B 9/04 |
| 10,013,893 B2* | 7/2018 | Harkness | G09B 9/02 |
| 10,325,512 B2* | 6/2019 | Welles | G09B 9/05 |
| 10,325,519 B2* | 6/2019 | Tan | G09B 9/042 |
| 2002/0061804 A1* | 5/2002 | Hasegawa | A63B 22/0694 |
| | | | 482/57 |
| 2002/0105481 A1* | 8/2002 | Kanevsky | G01C 21/365 |
| | | | 345/7 |
| 2002/0115043 A1* | 8/2002 | Baker | G09B 9/08 |
| | | | 434/30 |
| 2007/0009862 A1* | 1/2007 | Quinn | G09B 9/00 |
| | | | 434/38 |
| 2008/0064014 A1* | 3/2008 | Wojtczak | G09B 9/04 |
| | | | 434/69 |
| 2008/0300730 A1* | 12/2008 | Cleary | A63G 7/00 |
| | | | 701/1 |
| 2010/0279255 A1* | 11/2010 | Williams, II | G09B 9/14 |
| | | | 434/29 |
| 2011/0076649 A1* | 3/2011 | Best | G09B 9/05 |
| | | | 434/69 |
| 2011/0192241 A1* | 8/2011 | Aiki | G01M 17/0078 |
| | | | 73/865.3 |
| 2011/0213656 A1* | 9/2011 | Turner | B60L 3/12 |
| | | | 705/14.49 |
| 2012/0282588 A1* | 11/2012 | Stevens | G09B 9/14 |
| | | | 434/365 |
| 2012/0301853 A1* | 11/2012 | Garvis | G09B 9/14 |
| | | | 434/58 |
| 2013/0238198 A1* | 9/2013 | Prentice | B62D 35/02 |
| | | | 701/49 |
| 2014/0092332 A1* | 4/2014 | Price | B60R 1/001 |
| | | | 349/16 |
| 2014/0220513 A1* | 8/2014 | Harkness | G09B 9/05 |
| | | | 434/69 |
| 2014/0276090 A1* | 9/2014 | Breed | A61B 5/18 |
| | | | 600/473 |
| 2015/0160033 A1* | 6/2015 | Censo | G01C 21/3626 |
| | | | 701/400 |
| 2016/0321941 A1* | 11/2016 | Welles | G09B 9/05 |
| 2016/0346695 A1* | 12/2016 | Hoory | A63F 13/65 |
| 2017/0039871 A1* | 2/2017 | Harkness | G09B 9/052 |
| 2018/0151088 A1* | 5/2018 | Tan | G09B 9/042 |

\* cited by examiner

INTERACTIVE DRIVER TEST ADMINISTRATION SYSTEMS

FIELD

Illustrative embodiments of the disclosure generally relate to driver test administration systems. More particularly, illustrative embodiments of the disclosure relate to interactive driver test administration systems in which question-and-answer driver testing is combined with practical driver testing.

SUMMARY

Illustrative embodiments of the disclosure are generally directed to interactive driver test administration systems in which question-and-answer driver testing is combined with practical driver testing. An illustrative embodiment of the interactive driver test administration systems includes a vehicle actuating mechanism and an instruction vehicle movable on a vehicle travel surface and operatively engaged by the vehicle actuating mechanism for travel of the instruction vehicle on the vehicle travel surface. The instruction vehicle may include a vehicle chassis having vehicle wheels, a windshield on the vehicle chassis, driver inputs in the vehicle chassis and a central processing unit interfacing with the windshield and the driver inputs. The central processing unit may be configured to present and operate a virtual windshield screen in a selected one of a question-and-answer driver testing mode and a practical driver testing mode on the windshield. The central processing unit may be configured to operate the instruction vehicle via the vehicle actuating mechanism responsive to input from the driver inputs in the vehicle chassis. An answer selecting system may interface with the central processing unit.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower" "left", "rear" "right", "front" "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-10 of the drawings, an illustrative embodiment of the interactive driver test administration systems, hereinafter system, is generally indicated by reference numeral 1. The system 1 may enable a Department of Motor Vehicles (DMV) or other driver licensing agency to administer a driving test which may include question-and-answer driver testing and practical driver testing to a driving test taker (not illustrated) typically as the driving test taker seeks licensure to operate a motor vehicle. Accordingly, the system 1 may include an instruction vehicle 2. As will be hereinafter described, the instruction vehicle 2 may include various features which enable the DMV or other driver licensing agency to administer the driver testing to the driving test taker as the driving test taker sits in the instruction vehicle 2. The results of the question-and-answer driver testing and the practical driver testing may be used by the DMV or agency to grant or deny a license to operate a motor vehicle to the driving test taker.

Figure 1:
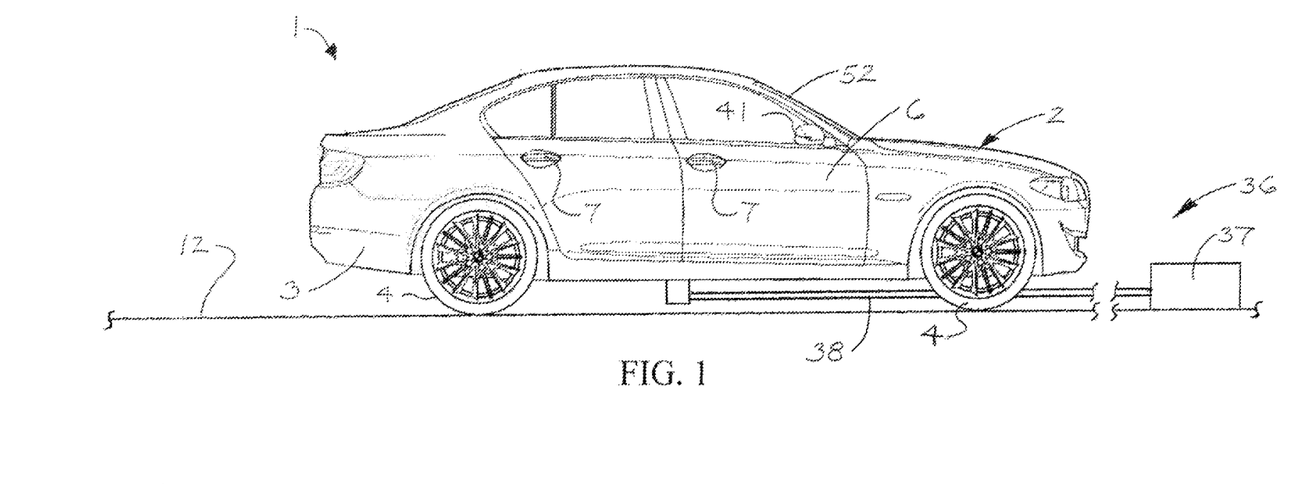
FIG. 1 is a side view of a typical instruction vehicle according to an illustrative embodiment of the interactive driver test administration systems.
Figure 2:
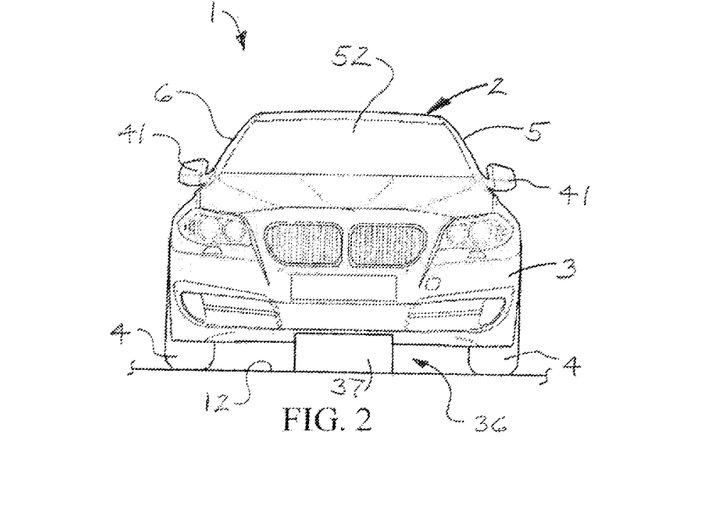
FIG. 2 is a front view of the instruction vehicle illustrated in FIG. 1.
Figure 3:
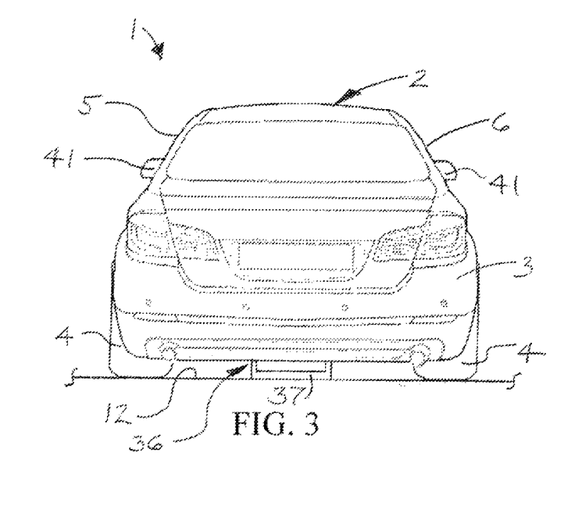
FIG. 3 is a rear view of the instruction vehicle illustrated in FIG. 1.

As illustrated in FIGS. 1-3, the instruction vehicle 2 of the system 1 may have a conventional automotive vehicle design with a vehicle chassis 3 fitted with vehicle wheels 4, a driver side door 5 and a passenger side door 6. Side view mirrors 41 may extend from the respective driver side door 5 and passenger side door 6. In some embodiments, a cage (not illustrated) may be provided on the interior of the driver side door 5 and/or the passenger side door 6. The driver side door 5 and the passenger side door 6 may each include a door handle 7. The instruction vehicle 2 may simulate the size and appearance and have the same features as a sedan, bus, truck, van or other vehicle for which licensure is being sought. In some embodiments, the instruction vehicle 2 may include other features including but not limited to a front suspension to support the vehicle chassis 3, shock absorbers, turn indicators, a drive shaft which transmits power from engine to wheels, transmission, electronic antilock brakes, a front towing hitch, bumpers, a radio with antenna, an ignition key or pushbutton, side and rearview mirrors, adjustable seats, seatbelts, windshield wipers (regular or video style), windshield, radiator grilles, brake fluid reservoir, air filter, battery, speed monitor, headlights, brake lights, hood with or without actuators for movement effects, gear shifters, actual and/or electronic oil dipstick, seat headrest, trunk, horn, gas cap, heated/non-heated rear windows, heated/non-heated windshield, power steering fluid reservoir, steel door beam, engine coolant reservoir, sockets, plugs, sensors, devices, trackers, monitors, vehicle accessories and tools.

A vehicle actuating mechanism 36 may operably engage the instruction vehicle 2 to facilitate selective forward or reverse movement of the instruction vehicle 2 as the vehicle wheels 4 travel on a vehicle travel surface 12, typically responsive to driver input of the driving test taker during testing. The vehicle actuating mechanism 36 may have any design which is known by those skilled in the art and suitable for the purpose. In some embodiments, the vehicle actuating mechanism 36 may include a vehicle actuating motor 37. An elongated actuating member 38 may be operably engaged by the vehicle actuating motor 37 for extension and retraction of the actuating member 38. The actuating member 38 may include a rod, shaft chain and/or other structural element which couples the instruction vehicle 2 to the vehicle actuating motor 37. Accordingly, responsive to operation of the vehicle actuating motor 37, the actuating member 38 may move the instruction vehicle 2 in the forward or reverse direction on the vehicle travel surface 12 responsive to the driver input of the driving test taker. In other embodiments, the vehicle actuating mechanism 36 may include a motor (not illustrated) which is supported by the vehicle chassis 3 of the instruction vehicle 2 in a manner which is similar to that of a conventional automotive vehicle.

Figure 4:
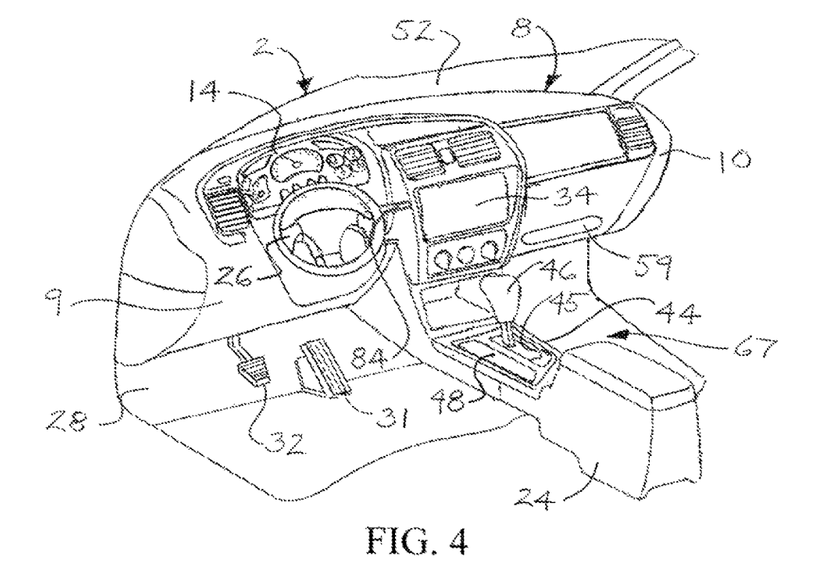
FIG. 4 is a perspective view of a typical vehicle dashboard in the instruction vehicle.
Figure 5:
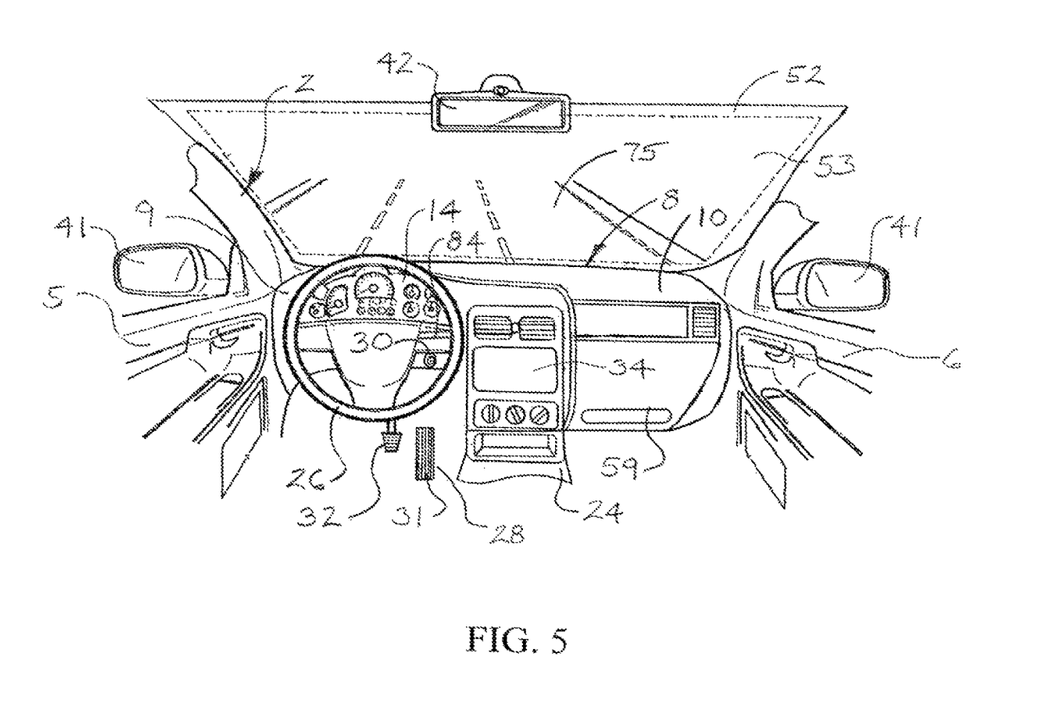
FIG. 5 is a front view of the typical vehicle dashboard.

As illustrated in FIGS. 4 and 5, a vehicle dashboard 8 may be provided in the interior of the instruction vehicle 2. The vehicle dashboard 8 may include a driver side portion 9 and a passenger side portion 10. A driver side seat and a passenger side seat (not illustrated) may be provided in the instruction vehicle 2 behind the driver side portion 9 and the passenger side portion 10, respectively. Driver inputs 29 for operating the instruction vehicle 2 may include a steering wheel 26, an ignition control 30, an accelerator pedal 31 and a brake pedal 32. The steering wheel 26 may be mounted on a steering column (not illustrated) which extends from the driver side portion 9 of the vehicle dashboard 8. The steering wheel 26 may operatively engage the front wheels 4 (FIG. 1) of the instruction vehicle 2 to facilitate steering of the instruction vehicle 2 on the vehicle travel surface 12. The ignition control 30 may accept an ignition key (not illustrated) which may be provided on the driver side portion 9 adjacent to the steering wheel 26. The accelerator pedal 31 and the brake pedal 32 of the driver inputs 29 may be provided on the vehicle floorboard 28 beneath the driver side portion 9. The brake pedal 32 may interface with vehicle brakes (not illustrated) which are configured to engage the vehicle wheels 4 for braking and slowing or stopping travel of the instruction vehicle 2 on the vehicle travel surface 12.

Figure 6:
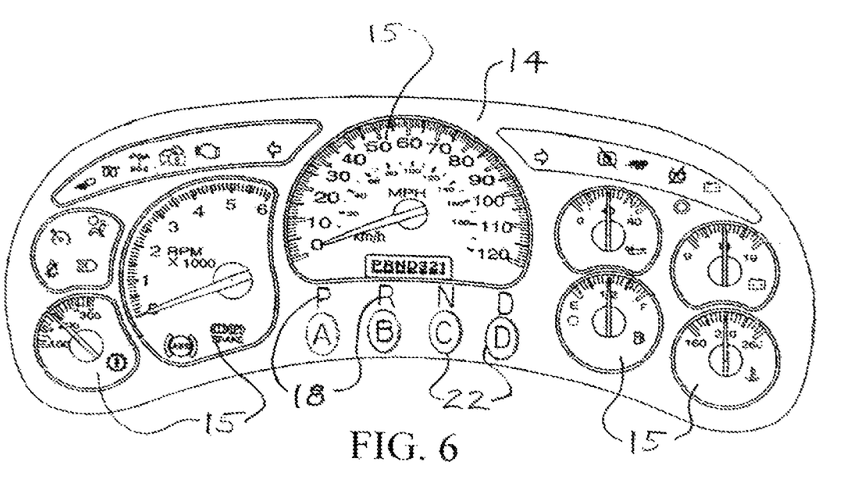
FIG. 6 is a front view of a typical gauge panel on the vehicle dashboard.

An instrument panel 14 may be provided on the driver side portion 9 of the vehicle dashboard 8. As illustrated in FIG. 6, the instrument panel 14 may include various instrument gauges 15. The instrument gauges 15 may correspond to the instrument gauges which are typically provided on the vehicle dashboard of a conventional vehicle and may include a speedometer, an RPM gauge, an oil pressure gauge, an oil temperature gauge and a battery charge gauge, for example and without limitation. Transmission status indicators 18 may be provided on the instrument panel 14. The transmission status indicators 18 may include the designations "P" for "PARK", "R" for "REVERSE" "N" for "NEUTRAL" and "D" for DRIVE". Test selector buttons 22 may be provided on the instrument panel 14 beneath, above or adjacent to the respective transmission status indicators 18. The test selector buttons 22 may be labeled "A" "B". "C" and "D", respectively. In typical implementation of the system 1, which will be hereinafter described, a driving test taker (not illustrated) may use the test selector buttons 22 to select from among multiple test options such as a question-and-answer driver testing mode 70 (FIG. 9) and a practical driver testing mode 74 (FIG. 10), for example and without limitation.

Figure 9:
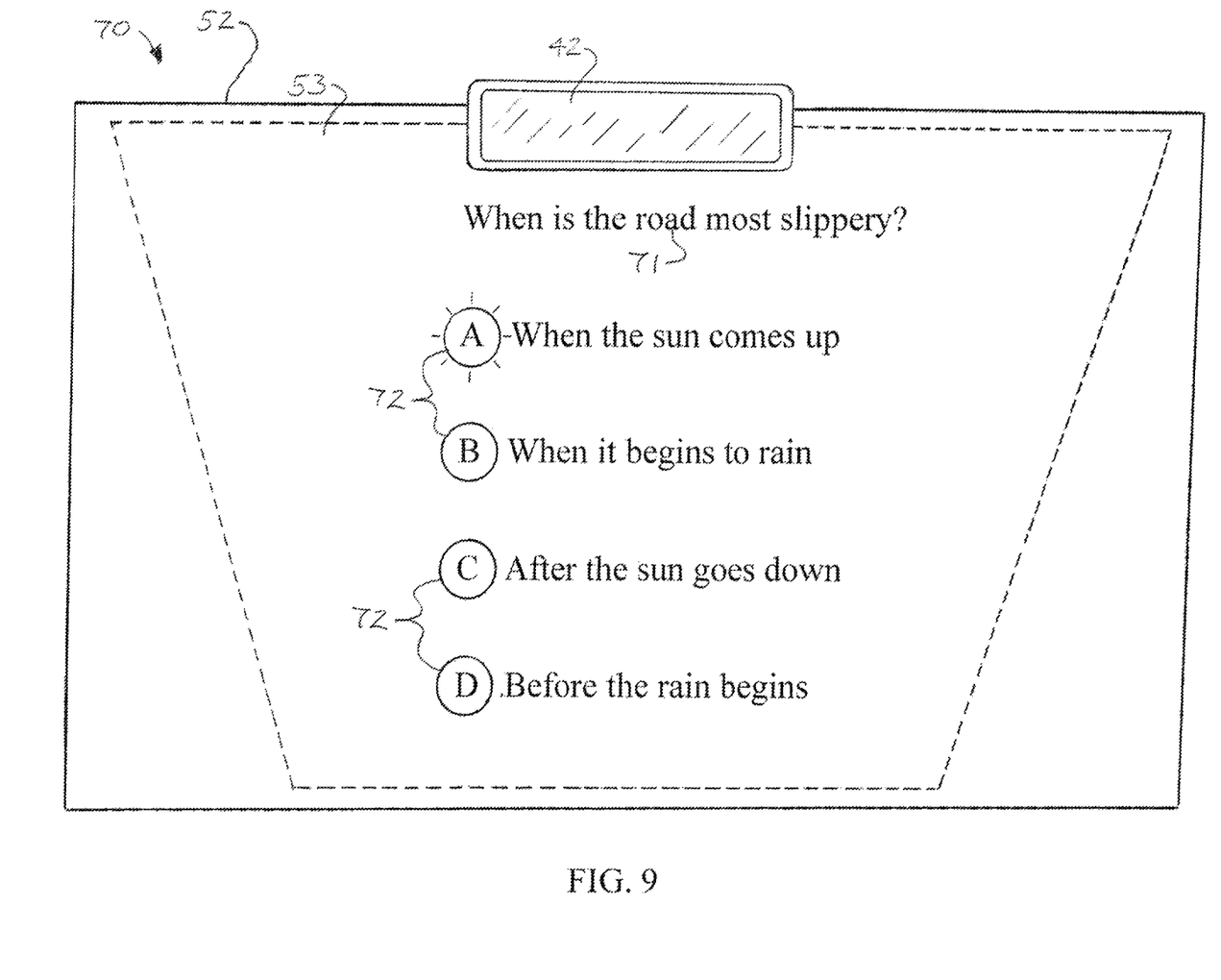
FIG. 9 is a front view of a typical windshield screen presented on the windshield of the instruction vehicle according to an illustrative embodiment of the interactive driver test administration systems, with a typical test question and multiple answers to the test question presented on the windshield screen in exemplary implementation of a question-and-answer driver testing mode of the interactive driver test administration systems.

As particularly illustrated in FIG. 5, the instruction vehicle 2 may include a windshield 52. The windshield 52 may extend upwardly and rearwardly at an angle from the vehicle dashboard 8. A rearview mirror 42 may be provided at the center top of the windshield 52. The instruction vehicle 2 may be suitably configured and programmed for display or presentation of a virtual windshield screen 53 on the windshield 52. As illustrated in FIG. 9, in the question-and-answer driver testing mode 70 of the system 1, a test question 71 and multiple test answer choices 72 may be presented in a multiple-choice format on the virtual windshield screen 53. The test answer choices 72 may be labeled with the designations "A". "B", "C" and "D", respectively. Accordingly, the driving test taker may select his or her answer to the test question 71 from among the test answer choices 72 typically in a manner which will be hereinafter described. The instruction vehicle 2 may be suitably configured and programmed for presenting test questions 71 in other formats such as a true/false format, for example and without limitation.

Figure 10:
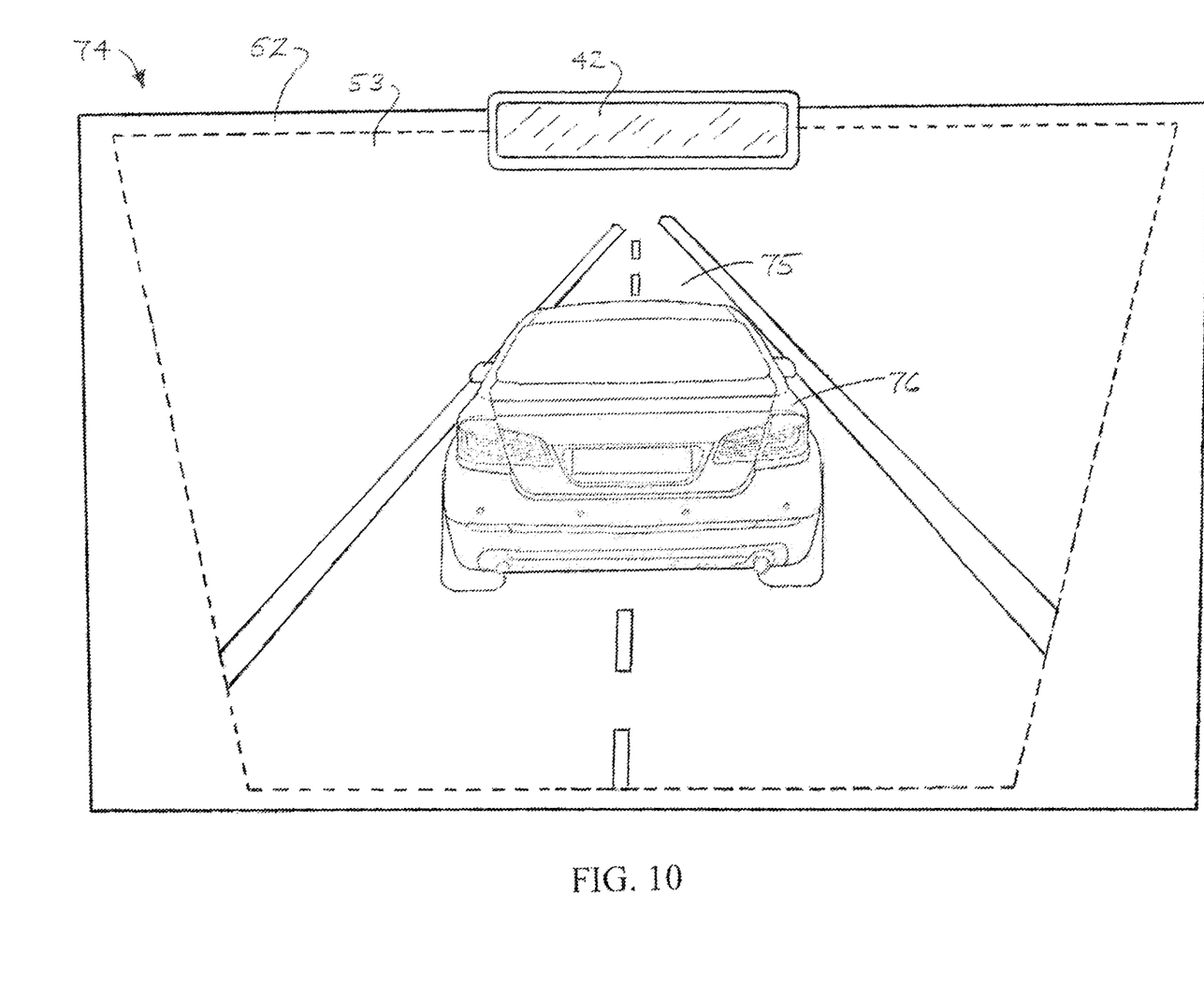
FIG. 10 is a front view of a typical windshield screen presented on the windshield of the instruction vehicle, with a typical virtual road and obstacle on the road in exemplary implementation of a practical driver testing mode of the interactive driver test administration systems.

As illustrated in FIG. 10, in the practical driver testing mode 74 of the system 1, the virtual windshield screen 53 may include a virtual road 75. A virtual obstacle 76 may be presented on the virtual road 75. Accordingly, the driving skills and reaction times of the driving test taker may be assessed by analyzing how quickly and accurately the driving test taker reacts to changes in the direction of the virtual road 75 and to the appearance of the virtual obstacle 76 on the virtual road 75.

As further illustrated in FIGS. 4 and 5, a center console 24 may be provided in the instruction vehicle 2. A data entry screen 34 may be provided in the center console 24 between the driver side portion 9 and the passenger side portion 10 of the vehicle dashboard 8 for purposes which will be hereinafter described.

Figure 7:
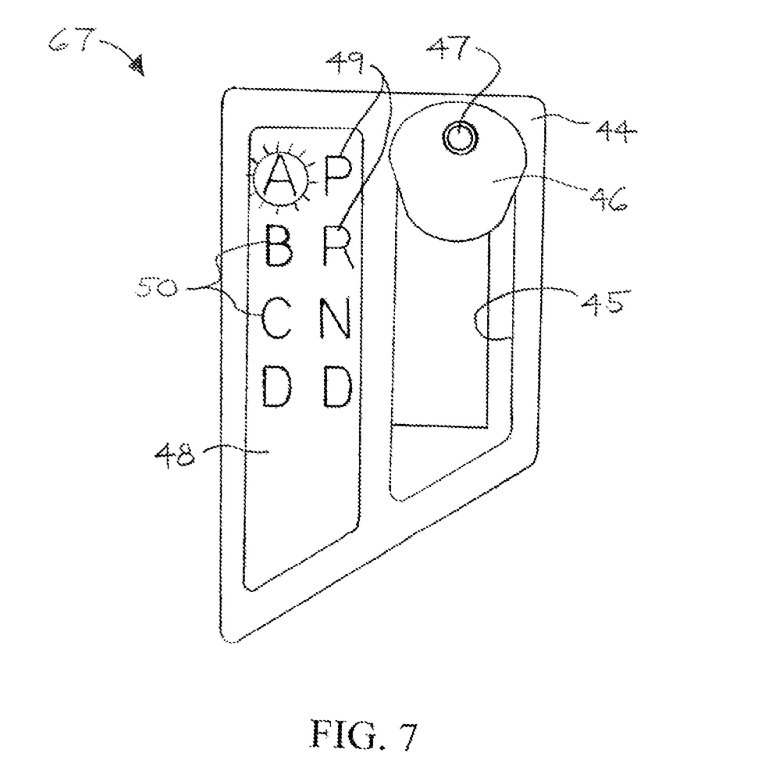
FIG. 7 is a top view of a typical transmission selector in the instruction vehicle.

As illustrated in FIGS. 4 and 7, an answer selection and entry system 67 may include a transmission selector 44. In some embodiments, the transmission selector 44 may be provided on the center console 24 between the driver side seat and the passenger seat (not illustrated). In other embodiments, the transmission selector 44 may be provided on the vehicle dashboard 8 or in any other suitable location or position in the instruction vehicle 2. The transmission selector 44 may include an elongated selector handle slot 45. A selector handle 46 may be mounted in the selector handle slot 45. The selector handle 46 may be selectively movable forwardly and rearwardly to various positions in the selector handle slot 45. An answer entry button 47 may be provided on the selector handle 46 for purposes which will be hereinafter described.

As further illustrated in FIG. 7, a transmission selector panel 48 may be provided on the transmission selector 44 adjacent to the selector handle slot 45. Multiple transmission indicators 49 may be provided on the transmission selector panel 48. The transmission indicators 49 may include the designations "P" for "PARK", "R" for "REVERSE", "N" for "NEUTRAL" and "D" for DRIVE". Test answer selections 50 may be provided on the transmission selector panel 48 adjacent to the respective transmission indicators 49. The test answer selections 50 may be labeled "A", "B", "C" and "D", respectively. In typical implementation of the question-and-answer driver testing mode 70 (FIG. 9) of the system 1, which will be hereinafter described, the driving test taker (not illustrated) may shift the selector handle 46 to align or correspond with one of the test answer selections 50 which correspond to a selected one of the test answer choices 72 (FIG. 9) to a test question 71 on the virtual windshield screen 53 presented on the windshield 52 of the instruction vehicle 2. The driving test taker may enter his or her selected test answer choice 72 by depressing the answer entry button 47 on the selector handle 46. As illustrated in FIGS. 4 and 5, in some embodiments, a selector lever 84 may extend from the steering wheel 26. The selector lever 84 may be manipulated by the driving test taker to select one of the test answer selections 50 which correspond to a selected one of the test answer choices 72 (FIG. 9) to a test question 71 on the virtual windshield screen 53.

In some embodiments, a printer 58 (FIG. 8) may be provided in the instruction vehicle 2. The printer 58 may be configured to print the results of the driving test after its completion. The printer 58 may be provided in any location in the instruction vehicle 2 which is accessible to the driving test taker as he or she sits in the instruction vehicle 2. In some embodiments, the printer 58 may be provided behind the passenger side portion 10 of the vehicle dashboard 8. As illustrated in FIGS. 4 and 5, an elongated printer slot 59 may be provided in the passenger side portion 10 of the vehicle dashboard 8 adjacent to the printer 58. Accordingly, upon completion of the driving test, the printer 58 may discharge a sheet of paper (not illustrated) on which the results of the driving test are printed through the printer slot 59. The printer 58 may be configured to print and discharge the test results upon actuation of a button such as one of the test selector buttons 22 (FIG. 6) on the instrument panel 14, on the data entry screen 24 (FIG. 5) which is typically in the center console 24 or in any other suitable location in the interior of the instruction vehicle 2.

Figure 8:
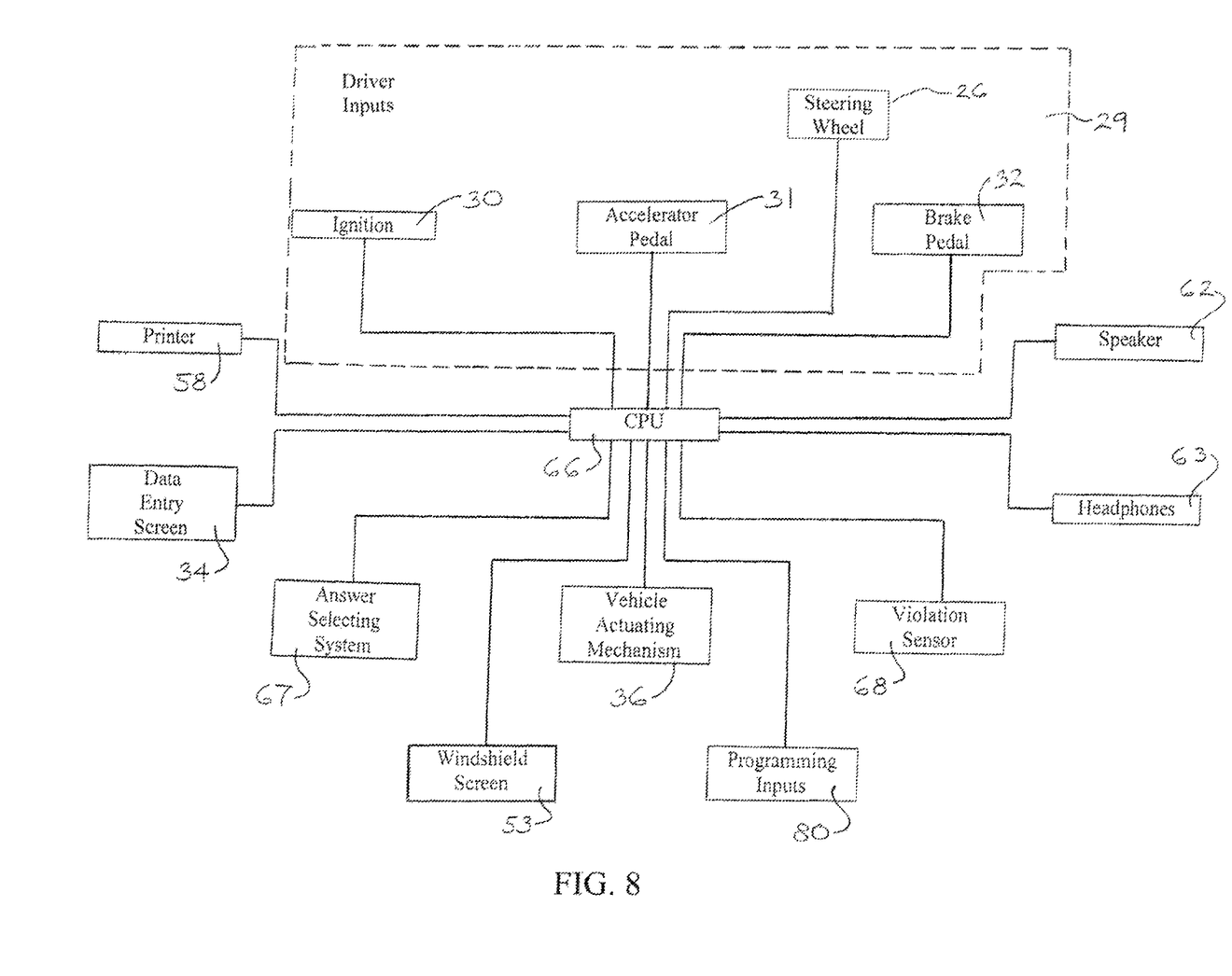
FIG. 8 is a functional block diagram illustrating various system components according to an illustrative embodiment of the interactive driver test administration systems.

Referring next to FIG. 8 of the drawings, a functional block diagram illustrating various system components according to the system 1 is illustrated. The system 1 may include a CPU (Central Processing Unit) 66 with memory. The vehicle actuating mechanism 36 (FIGS. 1-3) may controllably interface with the CPU 66. The ignition control 30 on the vehicle dashboard 8 (FIG. 5) may controllably interface with the CPU 66. In some embodiments, the ignition control 30 may include an ignition socket (not illustrated). Accordingly, upon insertion of a key (not illustrated) in the ignition socket 30 and turning of the key, the CPU 66 may energize the vehicle actuating mechanism 36 preparatory to actuating movement of the instruction vehicle 2. Alternatively, the ignition control 30 may include an ignition button (not illustrated). Upon depression of the ignition button, the CPU 66 may energize the vehicle actuating mechanism 36.

The accelerator pedal 31 may controllably interface with the CPU 66. Accordingly, the CPU 66 may be configured to actuate the vehicle actuating mechanism 36 upon depression of the accelerator pedal 31. The CPU 66 may additionally be configured to vary the operational speed of the vehicle actuating mechanism 36, and hence, the forward or reverse speed of the instruction vehicle 2 on the vehicle travel surface 12 according to the extent to which the accelerator pedal 31 is depressed. The CPU 66 may be configured to release actuation of the vehicle actuating mechanism 36 upon release of the accelerator pedal 31.

The brake pedal 32 may controllably interface with the CPU 66. Accordingly, the CPU 66 may be configured to actuate the vehicle brakes (not illustrated) to slow or stop the instruction vehicle 2 on the vehicle travel surface 12 upon depression of the brake pedal 32.

The printer 58 may interface with the CPU 66. The CPU 66 may be programmed to tabulate the results of the question-and-answer driver test and the practical driver test and operate the printer 58 to print the test results.

The data entry screen 34 (FIGS. 4 and 5) may interface with the CPU 66. The data entry screen 34 may be configured to enter test data such as the various test parameters into the CPU 66. The data entry screen 34 may include other inputs such as printer inputs for the printer 58.

The answer selecting system 67 may controllably interface with the CPU 66. Accordingly, in the question-and-answer driver testing mode 70 (FIG. 9) of the system 1, the CPU 66 may be programmed to present the test question 71 and the test answer choices 72 on the virtual windshield screen 53. The CPU 66 may be programmed to facilitate selection and entry of the selected test answer choice 72 responsive to input from the answer selecting system 67. Thus, the driving test taker may select one of the test answer choices 72 on the virtual windshield screen 53 by manually gripping and moving the selector handle 46 (FIG. 7) in the selector handle slot 45 until the selector handle 46 aligns or registers with the test answer selection 50 which corresponds to the selected test answer choice 72. As illustrated in FIG. 7, the test answer selection 50 with which the selector handle 46 is aligned may be illuminated to assist the driving test taker in visually verifying the test answer choice 72 which is selected. The selected test answer choice 72 may also be highlighted or illuminated on the windshield screen 53. The driving test taker may enter the selected test answer choice 72 by depressing the answer entry button 47 on the selector handle 46.

Programming inputs 80 may interface with the CPU 66. In some embodiments, the programming inputs 80 may include at least one data entry port (not illustrated) which may be provided on the vehicle dashboard 8, the center console 24 and/or elsewhere inside or on the instruction vehicle 2. The data entry port or ports may facilitate loading of software into the CPU 66 to facilitate implementation of the question-and-answer driver testing mode 70 (FIG. 9), the practical driver testing mode 74 (FIG. 10) and the other various operational functions of the CPU 66.

A traffic violation sensor 68 may interface with the CPU 66. The traffic violation sensor 66 may be configured to determine whether driving violations on the part of the driving test taker occur in implementation of the practical driver testing mode 74 (FIG. 10) in operation of the system 1. A speaker 62 may interface with the CPU 66 and may be provided in the instruction vehicle 2. The CPU 66 may be programmed to broadcast the violation to the driving test taker through the speaker 62 upon activation by the traffic violation sensor 66. Additionally or alternatively, headphones 63 may interface with the CPU 66 such as through a headphone jack (not illustrated on the vehicle dashboard 8, the center console 24 and/or other location in the interior of the instruction vehicle 2. The CPU 66 may be programmed to broadcast the violation to the driving test taker through the headphones 63 as the driving test taker wears the headphones 63 during the driving test.

Referring again to FIGS. 1-10 of the drawings, in typical implementation of the system 1, a driving test taker (not illustrated) typically opens the driver side door 5 and sits in the driver side seat of the instruction vehicle 2. To initiate the question-and-answer driver testing mode 70 (FIG. 9) of the driving test, the driving test taker may initially depress the test selector button 22 (FIG. 6) which is labeled "A" on the instrument panel 14. Accordingly, the CPU 66 may present the virtual windshield screen 53 having the test question 71 and test answer choices 72 on the windshield 52, as illustrated in FIG. 9. In applications in which the test question 71 and the test answer choices 72 are presented in a multiple-choice format, the driving test taker may select the test answer choice 72 which corresponds to his or her answer to the test question 71. The driving test taker may accomplish this by forward or rearward movement of the selector handle 46 in the selector handle slot 45 in the transmission selector 44 of the answer selecting system 67 (FIG. 7) until the selector handle 46 aligns or registers with the test answer selection 50 which corresponds to the test answer choice 72 (FIG. 9) on the virtual windshield screen 53. The driving test taker may enter his or her selected test answer selection 50 by depression of the answer entry button 47 on the selector handle 46. Throughout implementation of the question-and-answer driver testing mode 70, the CPU 66 (FIG. 8) may store the entered answers. At the conclusion of the of the driving test, the CPU 66 may tabulate the results of the To initiate the practical driver testing mode 74 (FIG. 10) of the driving test, the driving test taker may initially depress the test selector button 22 which is labeled "B" on the instrument panel 14. Accordingly, the CPU 66 may present the virtual windshield screen 53 having the virtual road 75 on the windshield 52, as illustrated in FIG. 10. The driving test taker may insert an ignition key (not illustrated) into a key socket (not illustrated) of the ignition socket 30 and turn the ignition key to initiate operation of the vehicle actuating mechanism 36 (FIGS. 1-3). Alternatively, the driving test taker may actuate the ignition socket 30 by depressing an ignition button (not illustrated). The driving test taker may move the selector handle 46 (FIG. 7) of the answer selecting system 67 forwardly or rearwardly in the selector handle slot 45 of the transmission selector 44 to align the selector handle 46 with one of the transmission indicators 49 on the transmission selector 44. For example, the driving test taker may position the selector handle 46 in alignment or registration with the "R" transmission indicator 49 to actuate reverse movement of the instruction vehicle 2, or with the "D" transmission indicator 49 to actuate forward movement of the instruction vehicle 2. Accordingly, the vehicle actuating mechanism 36 is primed to actuate reverse or forward movement, respectively, of the instruction vehicle 2 on the vehicle travel surface 12 via driver input through the accelerator pedal 31, as well as steering of the instruction vehicle 2 via the steering wheel 26 and braking of the instruction vehicle 2 via the brake pedal 32. As part of the practical driver testing mode 74 of the driving test, the driving test taker may operate and coordinate the accelerator pedal 31, the steering wheel 26 and the brake pedal 32 in such a manner as to successfully navigate the virtual road 75 on the virtual windshield screen 53 in a manner which is similar to that of an actual automotive vehicle. Thus, the virtual road 75 may be presented on the virtual windshield screen 53 in such a manner as to create the impression that the instruction vehicle 2 is traveling along the virtual road 75 at a speed which is commensurate with the degree to which the driving test taker depresses the accelerator pedal 31 and the brake pedal 32. Similarly, the trajectory of the virtual road 75 may vary to test the ability of the driving test taker to remain on the virtual road 75 through twists and turns in the virtual road 75. Moreover, obstacles 76 such as another vehicle, a person an animal, etc. may suddenly or gradually appear on the virtual road 75 to test the braking, steering and other evasive reactions of the driving test taker. Simultaneously, the vehicle actuating mechanism 36 may operate the instruction vehicle 2 on the vehicle travel surface 12 in a manner which corresponds to the inputs of the driving test taker via the accelerator pedal 31, the steering wheel 26 and the brake pedal 32 to simulate the driving forces which would actually be experienced by the driving test taker during an actual drive of an automobile. At the conclusion of the practical driver testing mode 74 of the driving test, the driving test taker may return the selector handle 46 to the forward position in the selector handle slot 45 to align or register with the "P" transmission indicator 49 and simulate parking of the vehicle.

In the event that the driving test taker commits a traffic violation such as speeding, lane change without signaling, etc., the traffic violation sensor 66 may indicate the traffic violation to the CPU 66. In turn, the CPU 66 may broadcast the violation to the driving test taker through the speaker 62 or the headphones 63 (FIG. 8). The CPU 66 may additionally include the violation in the test results which may be ultimately be printed by the printer 58 at the conclusion of the driving test.

Upon conclusion of the driving test, the printer 58 may print and dispense the test results to the driving test taker through the printer slot 59 (FIGS. 4 and 5). One of the test selector buttons 22 on the instrument panel 14, or alternatively, the data entry screen 34 (FIGS. 4 and 5) on the vehicle dashboard 8 may be accessed to initiate the printing function. DMV personnel may evaluate the results of the test to determine whether to grant the driving test taker licensure to operate a vehicle. In some applications, additional or alternative driver testing modes may be selected by depressing the test selector buttons 22 labeled "C" and "D" on the instrument panel 14.

Figure 11:
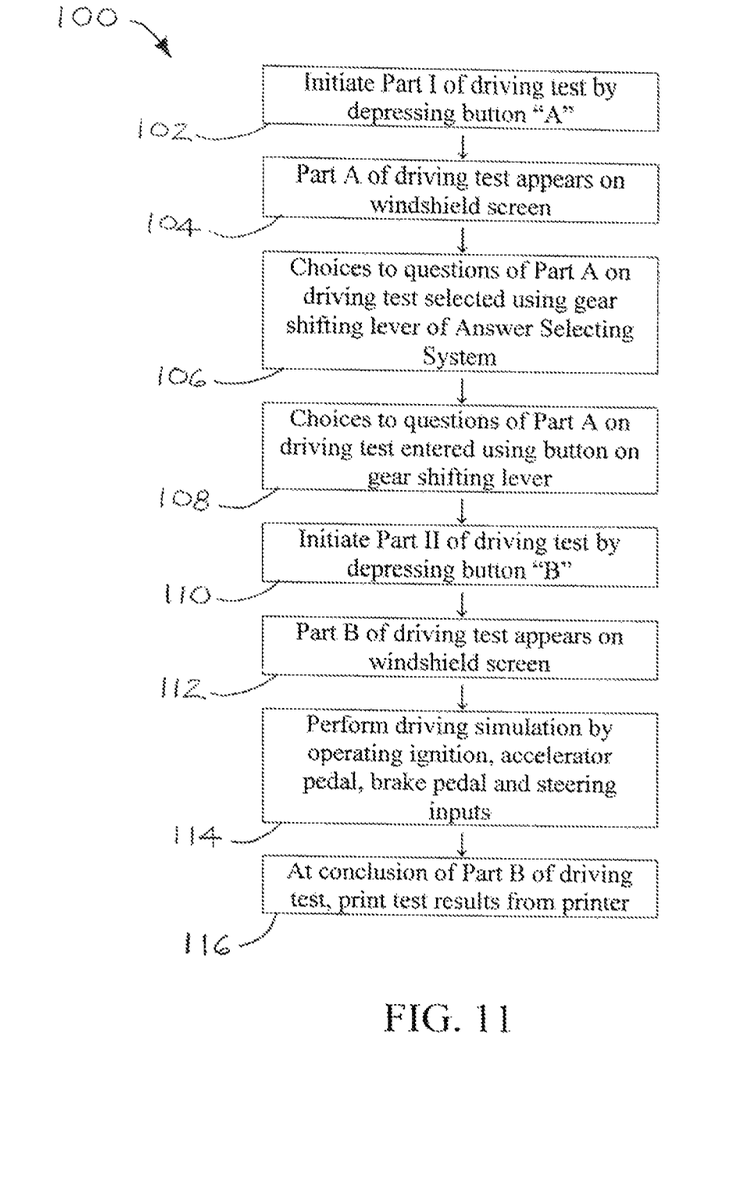
FIG. 11 is a flow diagram illustrating typical implementation of an illustrative embodiment of the interactive driver test administration systems.

Referring next to FIG. 11 of the drawings, a flow diagram 100 illustrating typical implementation of an illustrative embodiment of the interactive driver test administration systems 1 is illustrated. At Step 102, Part I of the driving test may be initiated by depression of a test selector button labeled "A". At Step 104. Part A of the driving test may appear on the windshield screen on the windshield of the instruction vehicle. In some applications, Part A of the driving test may be administered in a question-and-answer driver testing mode.

At Step 106, choices to questions of Part A on the driving test may be selected using a selector handle of an answer selecting system. The selector handle may resemble a gear shifting lever of an automobile. At Step 108, choices to the questions of Part A on the driving test may be entered using an answer entry button on the selector handle.

At Step 110, Part I of the driving test may be initiated by depression of a test selector button labeled "B". At Step 112.

Part B of the driving test may appear on the windshield screen on the windshield of the instruction vehicle. In some applications, Part B of the driving test may be administered in a practical driver testing mode. At Step 114, the driving test taker may perform a driving simulation by operating the ignition, accelerator pedal, brake pedal and steering inputs of the instruction vehicle. At Step 116, at the conclusion of Part B of the driving test, the test results may be printed from the printer. In some applications, additional parts of the driving test may be initiated by depressing test selector buttons labeled "C" or "D".

It will be appreciated by those skilled in the art that the interactive driver test administration systems of the present disclosure are applicable to any type of instruction vehicle including but not limited to cars, trucks, school or municipal buses, airplanes, helicopters, watercraft all-terrain vehicles (ATVs), trains and earth-moving equipment. The systems can be applied to game systems, vending booths, amusement park vehicles, commercial vehicles, bookmobiles, military vehicles, rescue vehicles, postal vehicles, food service delivery vehicles, and driver education vehicles of all types.

In some embodiments, the instruction vehicle 2 may include a built-in talking GPS driver education or trainer instruction unit which is configured and programmed to actuate the brakes of the instruction vehicle 2 to prevent the instruction vehicle 2 from striking an obstacle. Additionally or alternatively, the trailer instruction unit may be configured and programmed to beep, blink, speak or otherwise activate an audible alarm prior to striking the obstacle. The trailer instruction unit may be configured and programmed to activate an audible alarm in the event that the instruction vehicle 2 veers over the center line on the road, street or highway which is simulated on the vehicle support surface 12.

In some embodiments, the instruction vehicle 2 may include two steering wheels 26, two accelerator pedals 31 and two brake pedals 32 at the respective driver and passenger positions. Accordingly, the driving test taker may sit in the driver's position whereas an instructor may sit in the passenger's position. Both the driving test taker and the passenger may thus have access to the selector handle 46 of the transmission selector 44. The instruction vehicle 2 may include a built-in GPS instructor which may include a button located in the instructor vehicle 2. By depression of the button, a driving test taker may inquire as to a particular geographic location. The GPS instructor may additionally include the capacity to answer questions regarding the meaning of traffic signs such as yield signs, caution signs, etc.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An interactive driver test administration system, comprising:
    a vehicle actuating mechanism including a vehicle actuating motor on a vehicle travel surface and an elongated actuating member operably engaged by the vehicle actuating motor for extension and retraction of the actuating member; and
    an instruction vehicle movable on the vehicle travel surface and operatively engaged by the elongated actuating member of the vehicle actuating mechanism for travel of the instruction vehicle on the vehicle travel surface, the instruction vehicle including:
        a vehicle chassis having vehicle wheels, a driver side door, a passenger side door and side view mirrors on the driver side door and the passenger side door, respectively;
        a windshield on the vehicle chassis;
        driver inputs in the vehicle chassis;
        a central processing unit interfacing with the windshield and the driver inputs, the central processing unit configured to present and operate a virtual windshield screen in a selected one of a question-and-answer driver testing mode and a practical driver testing mode on the windshield and the central processing unit configured to operate the instruction vehicle via the vehicle actuating mechanism as the vehicle wheels traverse the vehicle travel surface responsive to input from the driver inputs in the vehicle chassis, the actuating member of the vehicle actuating mechanism configured to move the instruction vehicle in a forward or reverse direction on the vehicle travel surface responsive to operation of the driver inputs by a driving test taker;
        an answer selecting system interfacing with the central processing unit, the answer selecting system including:
            a transmission selector having a selector handle slot;
            a selector handle selectively movable in the selector handle slot;
            a transmission selector panel adjacent to the selector handle slot; and
            a plurality of transmission indicators on the transmission selector panel and a plurality of test answer selections on the transmission selector panel adjacent to the plurality of transmission indicators, respectively, the selector handle of the transmission selector configured to enable the driving test taker to enter test answer choices to a test question;
        a traffic violation sensor on the instruction vehicle, the traffic violation sensor interfacing with the central processing unit and configured to determine whether driving violations occur in implementation of the practical driver testing mode;
        a printer interfacing with the central processing unit;
        a vehicle dashboard in the instruction vehicle, the vehicle dashboard having a driver side portion and a passenger side portion;
        a printer slot in the vehicle dashboard adjacent to the printer.

2. The system of claim 1 further comprising an answer entry button on the selector handle.

3. The system of claim 1 further comprising a data entry screen in the instruction vehicle, the data entry screen interfacing with the central processing unit.

* * * * *